Sept. 11, 1962

R. L. DEGA 3,053,541

ROTARY SHAFT FLUID SEAL

Filed Feb. 19, 1960

INVENTOR.
Robert L. Dega
BY
S. C. Thorpe
ATTORNEY

3,053,541
ROTARY SHAFT FLUID SEAL
Robert L. Dega, Utica, Mich., assignor to General Motors Corporation, Detroit, Mich., a corporation of Delaware
Filed Feb. 19, 1960, Ser. No. 9,850
1 Claim. (Cl. 277—67)

This invention relates to rotary shaft fluid seals, and particularly those of the so-called "slinger type," such as are commonly employed in preventing lubricating oil loss at the power take-off end of an engine crankshaft.

It has long been the practice to seal against oil leakage at the power take-off or flywheel end of an internal combustion engine by employing a wick or lip type fixed seal between the opposing surfaces of the crankshaft and the crankcase or crankshaft bearing at this end of the engine, and to limit the amount of leakage oil reaching such seal by providing the shaft with a slinger located inwardly of the engine from this fixed seal. This slinger, in the form of an annular radial projection or enlargement of the shaft in this section, operates to centrifugally discharge leakage oil flowing to it along the shaft from the bearing, the oil being collected in an annular groove in the crankcase or bearing surrounding the slinger and returned to the crankcase by a drain passage. Difficulty, however, has frequently been encountered over the years with engine oil leakage past the fixed seal, and much effort has been devoted in improving its design, material used, etc.

While proper design of the fixed seal to prevent escape of oil reaching it from the bearing is important, it is believed one of the principal causes of its failure lies in the ineffectiveness of the slinger to prevent excessive oil pressures being developed against the fixed seal.

It is accordingly the principal object of this invention to improve the action of the slinger in carrying out its function of arresting flow of bearing leakage oil axially of the shaft toward the fixed seal, and more particularly to improve the means by which such oil collected in the slinger groove is returned to the crankcase. In accordance with the invention the drain passage to the crankcase from this groove is so arranged to cooperate with the centrifugal action of the slinger and the resulting flow of oil within the groove to expedite its discharge to the crankcase, thereby preventing excessive pressure build-up of oil in the groove which tends to overload the fixed seal with resultant leakage from the engine.

The means by which these and other objects and advantages of the invention are obtained will be better understood from the following description of two preferred embodiments thereof selected to illustrate the principles involved, having reference to the drawing wherein.

Figure 1:
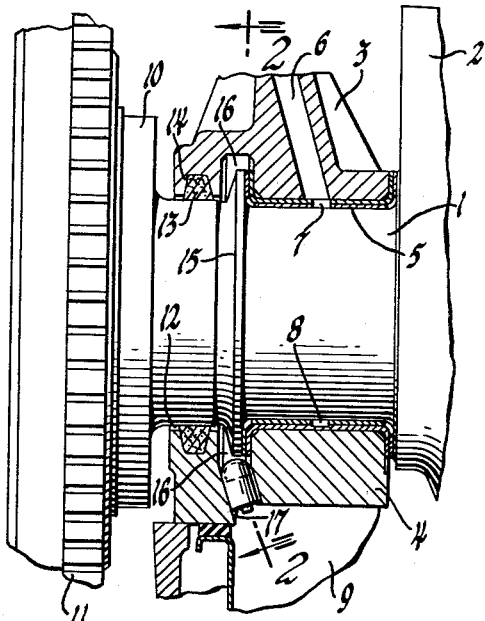
FIGURE 1 is a fragmentary part-elevational and part-sectional view of the rear end of an internal combustion engine, showing one form of my improved oil sealing arrangement applied to the flywheel end of the engine crankshaft.
Figure 2:
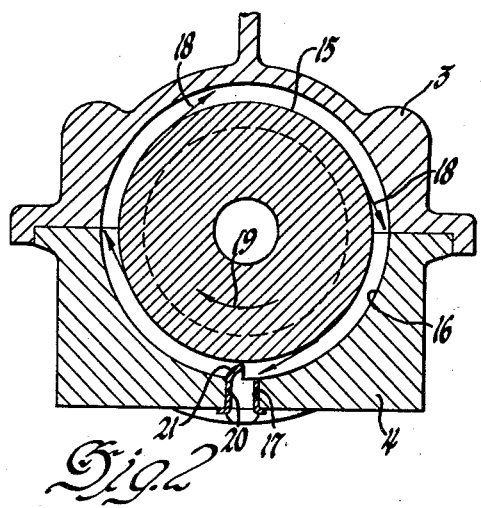
FIGURE 2 is a sectional view taken substantially along line 2—2 of FIGURE 1.
Figure 4:
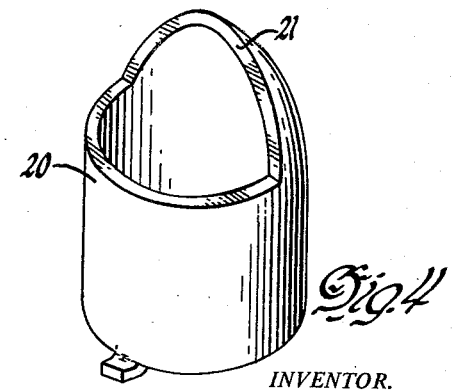
FIGURE 4 is an enlarged detail view in perspective of the oil scoop per se as used in the modification of FIGURES 1 and 2.

Referring now in detail to the drawing, and first to FIGURES 1, 2 and 4, a shaft, illustrated as the rear main journal 1 of an engine crankshaft 2, is shown supported for rotation in a member, illustrated as the crankcase 3 and the lower main bearing retainer or cap 4 of an internal combustion engine, which cap is secured to the crankcase in any conventional manner. The numeral 5 indicates the rear main bearing which is in two diametrically split halves, respectively fixed in suitable manner to the crankcase and cap. Oil for lubricating for the opposing internal and external rubbing surfaces of the journal 1 and bearing 5 is introduced as by a passage 6 in the crankcase, the oil being supplied thereto from the engine oil pump or other source (not shown). One or more holes 7 and connecting grooves 8 in the bearing 5 serve to distribute the oil to the journal surfaces from the feed passage 6.

Forming the lower part of the crankcase is a usual oil pan 9 which provides the sump for the engine lubricating oil, and into which oil drains from the bearings and other parts of the engine. At the extreme rear end of the crankshaft 2 is shown the usual flange 10 to which the flywheel 11 is connected. To prevent leakage of oil along the shaft through the opening 12 formed in the rear end of the crankcase and cap opposite the bearing 5, there is provided both the usual fixed sealing element 13 mounted in a groove 14 in the crankcase and bearing cap, and the usual oil slinger 15 in the form of an annular radial enlargement or projection of the crankshaft journal 1. Surrounding the slinger 15 is an oil collecting groove 16, the diametrically opposite halves of which are formed in the crankcase and in the bearing cap, and serving as passage means connecting the bottom of this groove with the interior of the crankcase oil pan 9 is a drain passageway 17. As best shown in FIGURE 2, this drain passageway may extend radially from the bottom of the groove in a vertical direction through the cap 4. Oil which is fed to the opposed surfaces of the journal 1 and bearing 5 via the lubricating passage 6 and tends to flow rearwardly along the shaft toward the fixed seal 13 is largely prevented from reaching this seal by the action of the slinger 15 in centrifugally discharging such leakage oil into the groove 16. The oil being thrown from the slinger into the groove 16 leaves the slinger periphery with a tangential component, as indicated by the arrows 18 in FIGURE 2, corresponding to the direction of shaft rotation, as shown by the arrow 19. As the result, the mass of oil collected in the slinger groove 16 is given a swirling motion. In order to minimize this swirling motion, and the resulting pressures of high magnitude which otherwise tend to build up and act against the fixed seal 13, I have provided the drain passageway 17 with an inlet which faces in the direction generally tangential to the shaft journal 1 and in opposed relation to the direction of shaft rotation. This is accomplished in accordance with the form of the invention shown in FIGURES 1, 2 and 4 by press fitting a baffle or scoop 20 in the drain passageway 17. This scoop, as best shown in FIGURE 4, takes the form of a hollow thimble-like stamping, open at both ends, and having a projecting lip 21 at its upper end extending into the groove 16 and tangentially of the journal 1. During operation, it will be apparent that the lip 21 on this scoop will act to direct the oil being thrown tangentially from the slinger into the drain passageway 17 with a minimum of turbulence, and thereby use the rotational energy of the oil in the slinger groove to scavenge this groove.

Figure 3:
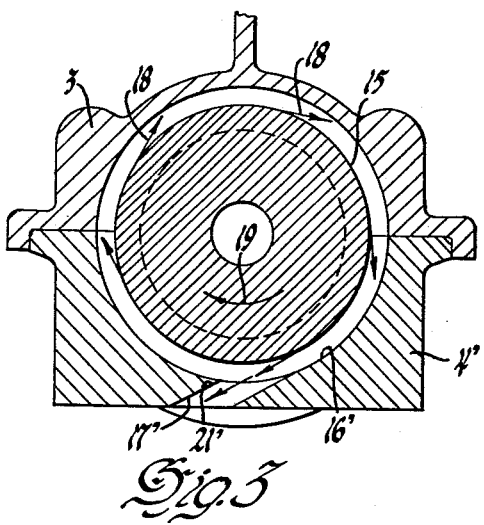
FIGURE 3 is a view similar to FIGURE 2 but showing a modified form of the invention.

In the modified form of the invention shown in FIGURE 3, the only change made in the parts from that previously described is that the drain passageway 17' is drilled tangentially through the bearing cap 4' in a direction corresponding to the direction 19 of rotation of the shaft. By so drilling this passageway, its inlet (formed by its intersection with the bottom of the groove 16') acts as a scoop in similar manner to that of the scoop 20 previously described, since what amounts to a lip 21' is formed by the acute angle between the bottom of the groove 16' and one side of the passageway 17'. The effectiveness of this tangentially drilled drain passageway in scavenging the slinger groove is not quite as great as that of the scoop 20, but has advantages of simplicity in eliminating the necessity of adding an additional part to the bearing cap. In any event a significant advantage in better scavenging of the slinger groove is obtained over that with a conventional radially drilled passageway.

While drainage from the slinger groove via a radially drilled passageway can be improved by increasing the size of the passageway, or elongating it in the plane of the slinger groove, the results are not as satisfactory as with either of the two forms of my invention as described, and such enlargement or elongation of the passageway impairs the strength of the bearing cap.

While only two preferred embodiments of the invention have been disclosed, it is appreciated that numerous minor changes in the construction and arrangement of the parts may be made without departing from the spirit and scope of the invention as hereinafter claimed.

I claim:

In a rotary shaft fluid sealing means including a rotatable shaft, a member having an opening into which the shaft extends, said member having an internal annular groove surrounding and facing the shaft within said opening, a radially extending annular projection on the shaft opposite said groove for arresting axial flow of fluid along the shaft and centrifugally redirecting said flow into the groove, and a generally radially extending drain passage extending from the bottom of said groove, the improvement therein of a scoop to receive fluid flowing rotatively of the shaft within the groove, said scoop consisting of a hollow thimble-like element having its axially open end press fitted in said passageway and its opposite end cut away on one side and terminating with a projecting lip extending into said groove.

References Cited in the file of this patent

UNITED STATES PATENTS

| | | |
|---|---|---|
| 2,190,670 | Mann | Feb. 20, 1940 |
| 2,266,407 | Bruestle | Dec. 16, 1941 |
| 2,564,792 | Roos | Aug. 21, 1951 |